No. 636,828. Patented Nov. 14, 1899.
C. A. MILLER.
ELLIPTIC SPRING.
(Application filed Apr. 21, 1899.)
(No Model.) 2 Sheets—Sheet 1.

Witnesses:
F. C. Stuart.
R. S. Orwig.

Inventor:
Charles A. Miller,
By Thomas C. Orwig, Atty.

THE NORRIS PETERS CO., PHOTO-LITHO., WASHINGTON, D. C.

No. 636,828. Patented Nov. 14, 1899.
C. A. MILLER.
ELLIPTIC SPRING.
(Application filed Apr. 21, 1899.)
(No Model.) 2 Sheets—Sheet 2.
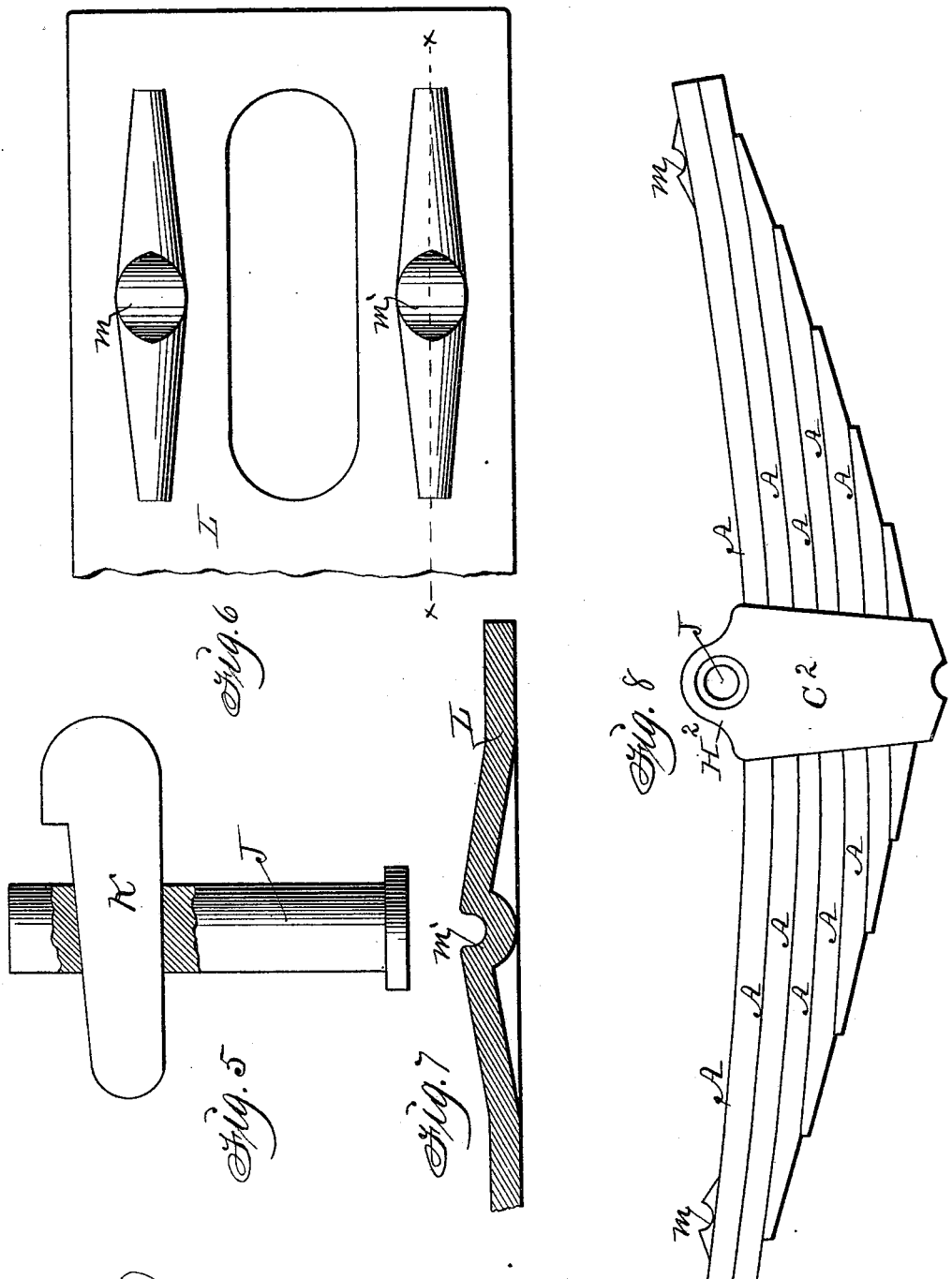
Witnesses: F.C. Stuart, N.S. Orwig.
Inventor: Charles A. Miller, By Thomas G. Orwig, Atty.

UNITED STATES PATENT OFFICE.

CHARLES A. MILLER, OF MARSHALLTOWN, IOWA.

ELLIPTIC SPRING.

SPECIFICATION forming part of Letters Patent No. 636,828, dated November 14, 1899.

Application filed April 21, 1899. Serial No. 713,902. (No model.)

*To all whom it may concern:*

Be it known that I, CHARLES A. MILLER, a citizen of the United States, residing at Marshalltown, in the county of Marshall and State of Iowa, have invented an Elliptical Spring, of which the following is a specification.

My objects are to prevent the impairment of the tensile strength of the overlying leaves of springs incident to bolt-holes and notches and shoulders formed at their central portions by the removal of metal, to prevent the longitudinal movements of leaves at their centers relative to each other, and to provide improved elliptic springs, single and double, for cars, carriages, and wherever applicable in machinery for sustaining weight and preventing concussion.

My invention consists in the construction, arrangement, and combination of overlying leaves, clamps for detachably binding them together, and means for connecting the ends of the springs with fixed supports to allow longitudinal movements between the end portions of the leaves, as hereinafter set forth, pointed out in my claims, and illustrated in the accompanying drawings, in which—

Figure 1:
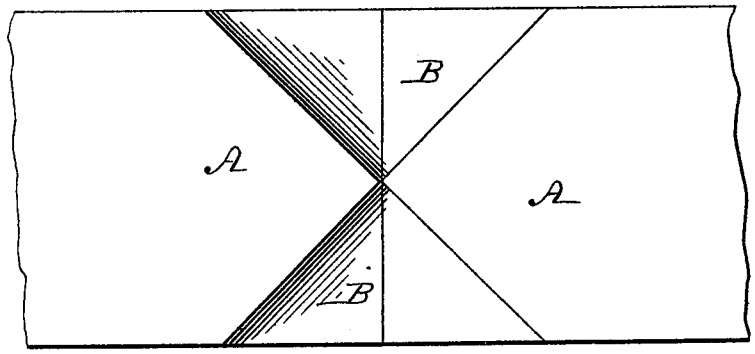
Figure 2:
Figure 3:
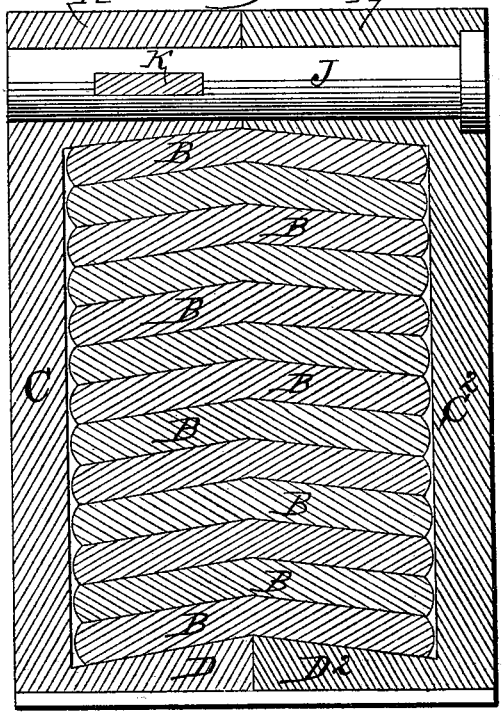
Figure 4:
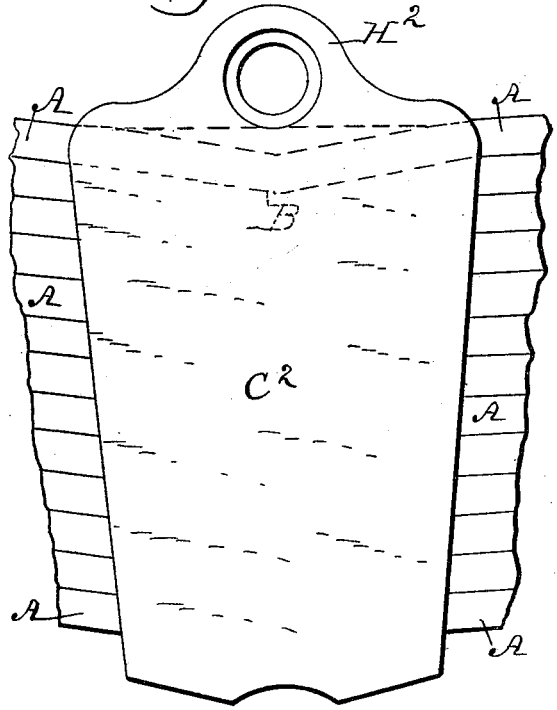

Figure 1 is a top view of the central portion of a metal leaf for springs; and Fig. 2, an edge view of the same, showing the manner in which cambers or concaves are formed to prevent longitudinal movements of overlying plates at their centers. Fig. 3 is a transverse sectional view of the centers of the overlying leaves and the mating parts of the clamp by which the leaves and the detachable clamp are bound together by means of a removable belt and key. Fig. 4 is a side view of the clamp and edge view of the parts of leaves that extend outside of the clamp in opposite directions therefrom. Fig. 5 is a detail view of the pin or bolt and a key for locking the mating parts of the clamps together, as required for binding the overlying central portions of the leaves rigidly togther. Fig. 6 is a top view, and Fig. 7 a sectional view, on the line $x\,x$ of Fig. 5, showing the means employed for connecting the ends of a spring with a railway-car or other object or machine where the spring can be advantageously used. Fig. 8 represents a spring composed of overlying leaves formed and bound together at their centers as contemplated by my invention.

The letter A designates the central portion of the leaf of a spring having concaves produced in its parallel sides extending from the outside edges to its center by means of a suitable press and dies to produce a camber B.

C and $C^2$ are the mating parts of a metal clamp produced by casting in a mold or in any suitable way. Their bottoms D and $D^2$ are inclined upward on their inside or top faces, so that when joined together they will produce a double-inclined plane to engage the concave surfaces or camber B in a leaf A. Their inside or bottom faces incline in the same way as shown in Fig. 3 and as required to overlie and engage the top surface of the upper leaf of the spring.

H and $H^2$ are integral upward extensions at the tops and centers of the mating parts C and $C^2$ and have coinciding bores for the admission of a pin or bolt J. The diameter of the bore in the extension $H^2$ is enlarged at its outer end to admit and countersink the head of the bolt. The portion of the bolt in the extension H has a slot $J^2$, and coinciding slots (not shown) in the extension on the opposite sides of the bore admit a key K as required to lock the bolt J and the mating parts C and $C^2$ securely together as required to clamp a plurality of leaves A, having cambers B, securely together, so that the overlying leaves are rigidly united in such a manner that the tensile strength of each one remains unimpaired and also in such a manner that they can be readily disconnected whenever desired.

L is the end portion of the top leaf of a spring. It has a central elongated opening to admit a link or hanger and bearings $m$ and $m'$ on the opposite sides of the said opening, as shown in Figs. 6, 7, and 8, to produce a gib-seat.

It is obvious the overlying end portions of the leaves of the spring must all be provided with coinciding openings corresponding with the opening in the end L of the upper leaf in order that a link or hanger may be connected therewith in such a manner that the ends of a spring can be depressed under weight and move up and down as required to accommodate the spring to the different degrees of pressure and strain to which it may be subjected in practical use. It is also obvious that the mating clamps C and C² and leaves A may vary in size and number as required to produce springs of various sizes and for different purposes, and that the lower ends of the cambers B in the leaf A engage the inclined upper or inside faces of the bottoms of the mating parts C and C².

Having thus described the construction and function of each part, the complete invention and its operation and utility will be readily understood by persons familiar with the art to which it pertains, and what I therefore claim as new, and desire to secure by Letters Patent therefor, is—

1. A clamp for detachably connecting a plurality of leaves in a spring consisting of two mating parts having the inside faces of their tops and bottoms inclined as shown and extensions at tops provided with coinciding apertures for a pin or bolt as shown and described for the purposes stated.

2. In an elliptic spring, a plurality of overlying leaves having cambers at their centers and a clamp consisting of two mating parts adapted to inclose the overlying leaves and provided with inside faces at their tops and bottoms adapted to fit the forms of the overlying springs and also having extensions at their tops provided with coinciding boltholes, a pin or bolt extending through the holes and means for locking the pin or bolt, arranged and combined as shown and described for the purposes stated.

3. An elliptic spring comprising a plurality of overlying leaves and each leaf having concaves or cambers at its center, a clamp composed of mating parts adapted to inclose the overlying centers of the leaves and the inside faces of their tops and bottoms inclined to conform with the faces of the leaves contacting therewith, extensions at their tops provided with coinciding pin-holes, a pin extended through the holes and a key extended through coinciding slots in the pin and one of the mating parts of the clamp, all arranged and combined to operate in the manner set forth, for the purposes stated.

CHARLES A. MILLER.

Witnesses:
ALBERT T. ELLIS,
W. L. PLACE.